(12) United States Patent
Kajiwara et al.

(10) Patent No.: US 10,920,402 B2
(45) Date of Patent: Feb. 16, 2021

(54) EMERGENCY STOP APPARATUS AND METHOD FOR WORKING MACHINE (71) Applicant: NIPPO CORPORATION, Tokyo (JP)

(72) Inventors: Satoru Kajiwara, Tokyo (JP); Hisashi Aita, Tokyo (JP); Taka Miyamoto, Tokyo (JP)

(73) Assignee: NIPPO CORPORATION, Tokyo (JP)

(*) Notice: Subject to any disclaimer, the term of this patent is extended or adjusted under 35 U.S.C. 154(b) by 241 days.

(21) Appl. No.: 16/323,773

(22) PCT Filed: Dec. 28, 2018

(86) PCT No.: PCT/JP2018/048574
§ 371 (c)(1),
(2) Date: Feb. 6, 2019

(87) PCT Pub. No.: WO2019/155794
PCT Pub. Date: Aug. 15, 2019

(65) Prior Publication Data
US 2020/0318317 A1 Oct. 8, 2020

(30) Foreign Application Priority Data
Feb. 7, 2018 (JP) .............................. JP2018-019846

(51) Int. Cl.
E02F 9/20 (2006.01)
B60T 7/22 (2006.01)
(Continued)

(52) U.S. Cl.
CPC .............. *E02F 9/2083* (2013.01); *B60T 7/22* (2013.01); *E02F 9/24* (2013.01); *E02F 9/264* (2013.01)

(58) Field of Classification Search
CPC . E02F 9/2083; E02F 9/24; E02F 9/264; E02F 9/16
See application file for complete search history.

(56) References Cited

U.S. PATENT DOCUMENTS 5,563,355 A 10/1996 Pluta et al.
6,264,228 B1 7/2001 Westervelt
(Continued)

FOREIGN PATENT DOCUMENTS

CN 108177597 A * 6/2018
JP S 58-113579 U 8/1983
(Continued)

OTHER PUBLICATIONS

International Preliminary Report on Patentability from PCT/JP2018/048574, dated Aug. 20, 2020, 6 pages.

*Primary Examiner* — Michael J Zanelli
(74) *Attorney, Agent, or Firm* — Morgan, Lewis & Bockius LLP (57) ABSTRACT An emergency stop apparatus includes a detecting device for detecting an obstacle intruding into a predetermined area around a working machine, an actuator fixed to a vehicle body of the construction machine or a member attached to the vehicle body, a coupling member for coupling an output shaft of the actuator with a brake pedal, and an electronic control unit. When the obstacle is detected by the detecting device, the electronic control unit actuates the actuator to move the brake pedal in an actuation direction of the service brake.

10 Claims, 11 Drawing Sheets (51) Int. Cl.
*E02F 9/24* (2006.01)
*E02F 9/26* (2006.01)

(56) References Cited

U.S. PATENT DOCUMENTS

| | | | |
|---|---|---|---|
| 6,926,125 B1 | | 8/2005 | Westervelt |
| 9,656,667 B2 * | | 5/2017 | Agnew ............. B60W 30/0956 |
| 2014/0118486 A1 * | | 5/2014 | Luo ........................... B60R 1/00 |
| | | | 348/36 |

FOREIGN PATENT DOCUMENTS

| | | |
|---|---|---|
| JP | S 61-203163 U | 12/1986 |
| JP | H 05-008707 A | 1/1993 |
| JP | H 06-024302 A | 2/1994 |
| JP | 2001-010457 A | 1/2001 |
| JP | 2010-091317 A | 4/2010 |
| JP | 2014-065471 A | 4/2014 |
| JP | 2015-004345 A | 1/2015 |
| JP | 2015-047045 A | 3/2015 |
| JP | 2016-153558 A | 8/2016 |
| JP | 10-237906 A | 9/2018 |
| WO | WO 2012/086438 | 6/2012 |
| WO | WO2019/225198 A1 * | 11/2019 |

* cited by examiner

EMERGENCY STOP APPARATUS AND METHOD FOR WORKING MACHINE

TECHNICAL FIELD

The present invention relates to an apparatus and a method for stopping a working machine in an emergency.

BACKGROUND OF THE DISCLOSURE

In order to ensure safety of a worker working near a working machine, a technique for emitting an alarm such as by sound and light when the worker and the working machine come close to each other, as disclosed in JP H10-237906 A.

BRIEF SUMMARY OF THE DISCLOSURE

Technical Problem

However, a sound alarm cannot be used during nighttime work for fear of complaints about noise, which sometimes makes it difficult to ensure the safety of a worker. Also, the awareness level of the alarm is decreased as the operator of the working machine or the worker become accustomed to the alarm sound, and there is a possibility that the safety of the worker cannot be ensured.

Thus, it is an object of the present invention to provide an apparatus and a method for stopping a working machine in an emergency, which is capable of ensuring the safety of the worker working around the working machine.

Solution to Problem

In order to solve the problem, an emergency stop apparatus for a working machine comprises: a detecting device for detecting an obstacle intruding into a predetermined area around the working machine; an actuator fixed to a vehicle body of the working machine or a member attached to the vehicle body; a coupling member for coupling an output shaft of the actuator and a brake pedal; and an electronic control unit. The electronic control unit actuates the actuator and moves the brake pedal in an actuation direction of a service brake when the obstacle is detected by the detecting device.

Additionally, in an emergency stop method for a working machine, when an electronic control unit which is capable of reading an output signal of a detecting device for detecting an obstacle intruding into a predetermined area around the working machine and capable of outputting a driving signal to an actuator for moving a brake pedal in an actuation direction of the service brake detects an obstacle intruding into the predetermined area, the electronic control unit outputs the driving signal to the actuator to move the brake pedal in an actuation direction of the service brake to stop the working machine in an emergency.

Advantageous Effects of Invention

According to the present invention, the safety of a worker who works around the working machine can be ensured.

DETAILED DESCRIPTION

Hereinbelow, embodiments for implementing the present invention will be described in detail with reference to the accompanying drawings.

Figure 1:
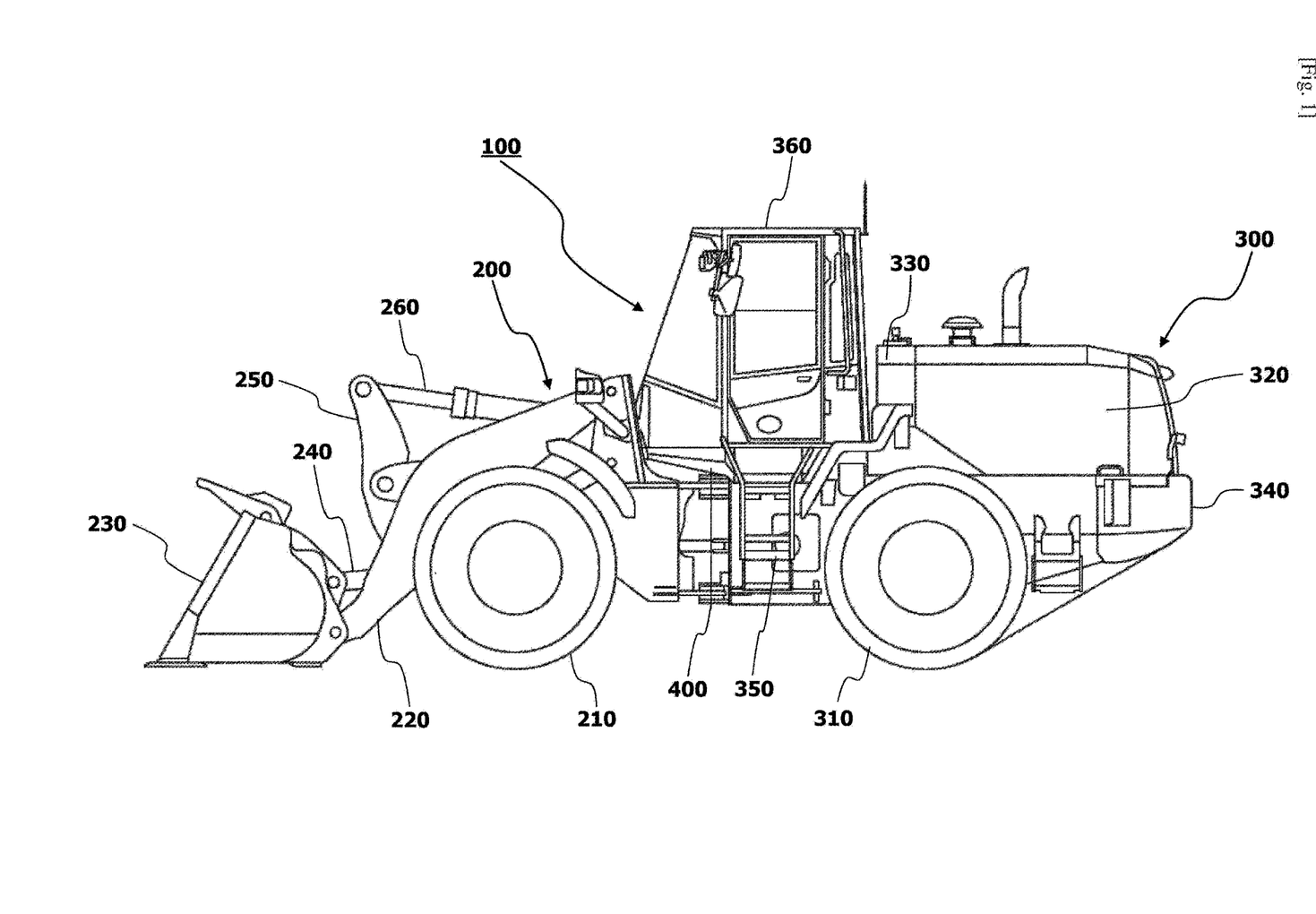
FIG. 1 is a side view illustrating an example of a wheel loader.

FIG. 1 illustrates an example of a wheel loader 100 which uses a bucket attached to a tip of the vehicle body to scoop gravel or crushed stones and lade them on such as a dump truck. The wheel loader 100 is an example of the working machine.

The wheel loader 100 includes a front vehicle body 200 and a rear vehicle body 300. The front vehicle body 200 and the rear vehicle body 300 are foldably joined to each other through a vertically extending center pin 400.

A pair of right and left front wheels 210 having rubber tires and wheel disks, for example, are fixed to a front lower part of the front vehicle body 200. Additionally, base end portions of a pair of right and left lift arms 220 are rotatably fixed about a laterally extending axis at opposite sides of the front vehicle body 200. A laterally extending bucket 230 is rotatably fixed about a laterally extending axis at a tip section of the pair of right and left lift arms 220. The tip sections of a pair of right and left arm cylinders (not shown), having base end portions swingably fixed to the front vehicle body 200, are rotatably fixed about a laterally extending axis at intermediate portions of the pair of right and left lift arms 220.

Furthermore, the end of a tilt rod 240 is rotatably fixed about a laterally extending axis at the rear central portion of the bucket 230. The end of a tilt arm 250, having an intermediate portion swingably fixed relative to the front vehicle body 200, is rotatably fixed about a laterally extending axis at another end of the tilt rod 240. The tip section of the bucket cylinder 260, having a base end portion swingably fixed relative to the front vehicle body 200, is rotatably fixed about a laterally extending axis at the other end of the tilt arm 250.

Accordingly, the height of the bucket 230 can be changed by extending and retracting the arm cylinders to move the tip sections of the pair of right and left lift arms 220 up and down. Additionally, the angle of the bucket 230 relative to the pair of right and left lift arms 220 can be changed through the tilt arm 250 and the tilt rod 240 by extending and retracting the bucket cylinder 260. Therefore, the height and posture of the bucket 230 relative to the front vehicle body 200 can be changed by appropriately controlling the arm cylinders and bucket cylinder 260.

A pair of right and left rear wheels 310 having rubber tires and wheel disks, for example, is fixed at a central lower part of the rear vehicle body 300. Additionally, an engine as a prime mover (not shown) is loaded above the rear vehicle body 300, and an engine hood 320 for covering the upper surface and opposite sides of the engine is mounted in an openable and closable manner. In front of the engine, a fuel tank 330 for storing engine fuel is fixed in a state in which an oil filling port is exposed outside. At a back of the rear vehicle body 300, there is loaded a counter weight 340 for suppressing the back of the wheel loader 100 to be lifted when gravel or crushed stones, etc. are scooped by the bucket 230.

Furthermore, the base end portions of a pair of right and left steering cylinders 350 are rotatably fixed about a vertically extending axis at the rear vehicle body 300. The tip sections of the pair of steering cylinders 350 are rotatably fixed about a vertically extending axis at two spaced-apart positions at the back of the front vehicle body 200. Accordingly, when the pair of right and left steering cylinders 350 are actuated such that one of the steering cylinders is extracted and another one is retracted, the front vehicle body 200 folds relative to the rear vehicle body 300, and the wheel loader 100 can be steered. Additionally, a driver stand 360 for the operator of the wheel loader 100 is fixed at the front upper surface of the rear vehicle body 300.

The engine loaded on the rear vehicle body 300 generates a hydraulic pressure for causing the arm cylinders, bucket cylinder 260 and steering cylinders 350 to work, and drives the front wheels 210 of the front vehicle body 200 and the rear wheels 310 of the rear vehicle body 300. Here, the front wheels 210 and rear wheels 310 may also be driven by the hydraulic pressure.

Figure 2:
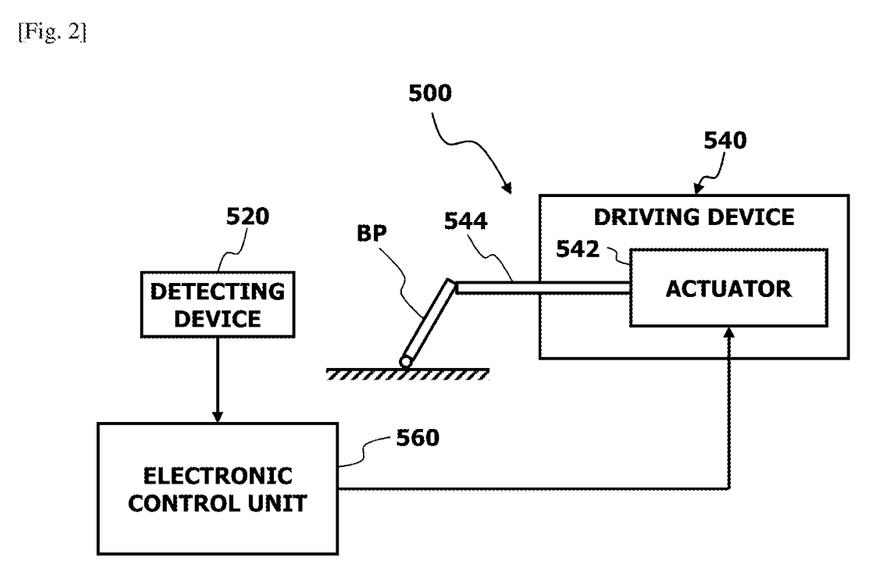
FIG. 2 is a block diagram illustrating an example of an emergency stop apparatus.

FIG. 2 illustrates an example of an emergency stop apparatus 500 loaded on the wheel loader 100. The emergency stop apparatus 500 is broadly divided into a detecting device 520 for detecting an obstacle intruding into a predetermined area around the wheel loader 100, a driving device 540 for moving a brake pedal BP of the wheel loader 100 in an actuation direction of the service brake, and an electronic control unit 560 with a built-in microcomputer.

The detecting device 520 is mounted on a predetermined place of the wheel loader 100, for example, at the rear upper part of the rear vehicle body 300. Additionally, the detecting device 520 detects an obstacle intruding into a predetermined area around the wheel loader 100, specifically, the obstacle intruding into the predetermined area behind the wheel loader 100. The predetermined area for detecting the obstacle is, for example, between 2-6 m width and 2-10 m from the wheel loader 100, preferably 4-6 m from the wheel loader 100, although it may vary according to site situation and the like.

Figure 3:
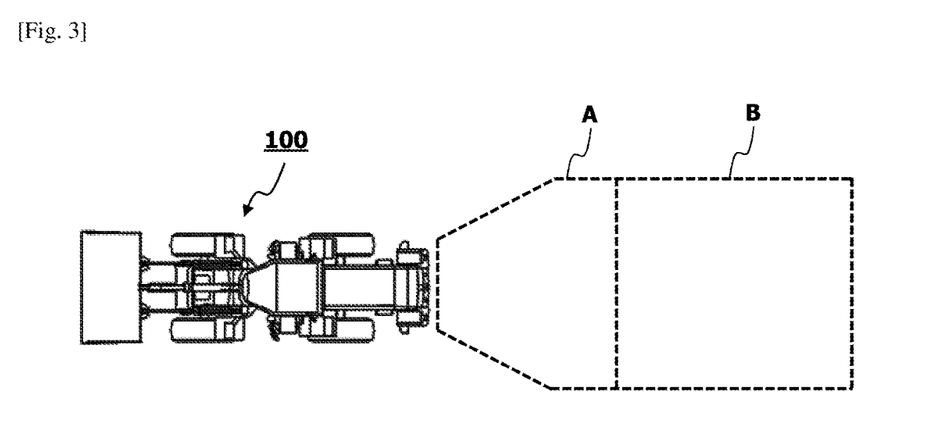
FIG. 3 is a plan view explaining an example of an obstacle detection area of a detecting device.

A stereo camera with excellent water resistance, stain resistance and dust resistance, such as "BLAXTAIR (Trademark)" sold by EUREKA Ltd., can be used as the detecting device 520. The detecting device 520, as shown in FIG. 3, can arbitrarily switch detecting either a person (such as a pedestrian and a worker) or some other objects in the area A located closest to the wheel loader 100 and detecting only a person in the area B which is located more distant from the area A. When the stereo camera is used as the detecting device 520, a monitor may be installed in the driver stand 360 of the wheel loader 100 to display an image taken by the stereo camera on a monitor.

Examples of the obstacle are a person and other objects. Additionally, the detecting device 520 processes an image taken by the camera to detect the obstacle, and thus, the detecting device 520 may be equipped with a function which can freely set the detecting area of the obstacle.

The driving device 540 has an actuator 542 fixed to the rear vehicle body 300 or a member attached to the rear vehicle body 300 (for example, a bracket), and a coupling member 544 for coupling an output shaft of the actuator 542 and the brake pedal BP. Here, it is desirable to use an electric actuator as the actuator 542 so as to be easily retrofitted to the wheel loader 100.

Figure 4:
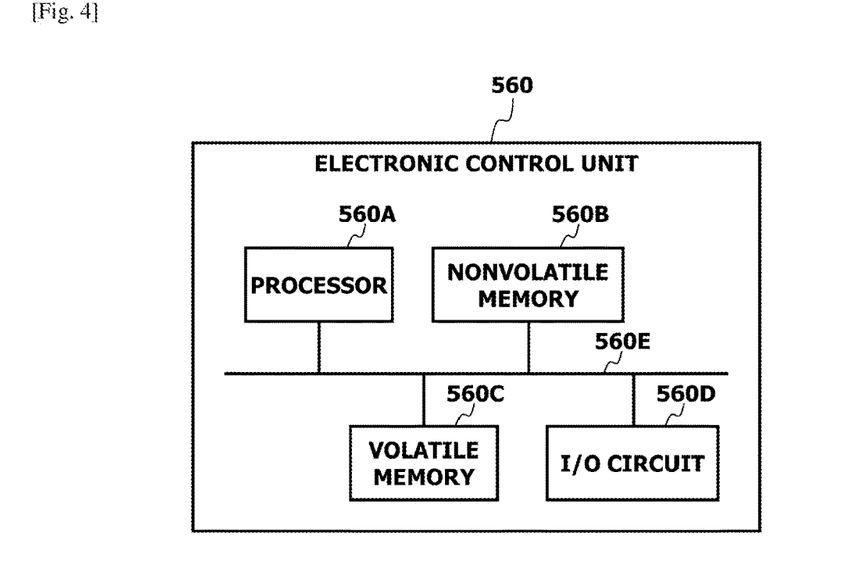
FIG. 4 is an internal structural diagram illustrating an example of an electronic control unit.
Figure 5:
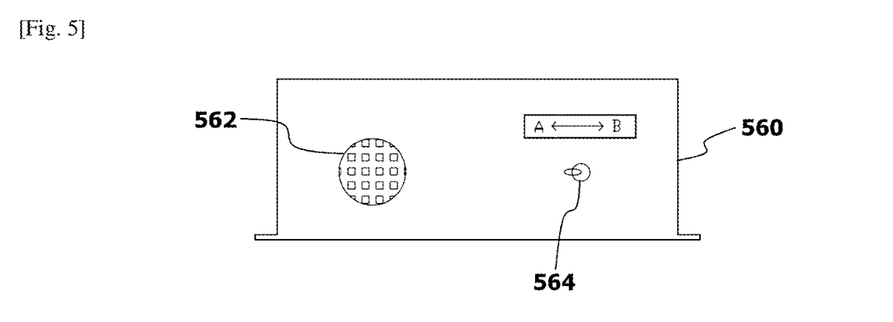
FIG. 5 is a front view illustrating an example of a housing of the electronic control unit.

The electronic control unit 560, as shown in FIG. 4, incorporates a processor 560A such as a CPU (central processing unit), a nonvolatile memory 560B, a volatile memory 560C, an input and output circuit 560D, and a bus 560E for communicatively connecting them. The nonvolatile memory 560B, for example contains such as an electrically data rewritable flash ROM (read only memory), and stores such as a control program and a control variable of the emergency stop apparatus 500. The volatile memory 560C, for example, contains a dynamic RAM (random access memory), and provides a temporal storage area in an arithmetic process of the processor 560A. The input and output circuit 560D, for example, contains an IC (integrated circuit), and provides input and output functions of the analog and digital signals with external equipment. Additionally, as shown in FIG. 5, a buzzer 562 for notifying intrusion of the obstacle in a predetermined area, and a switch 564 for switching a detection area of the obstacle between the area A and area B, are mounted on a housing of the electronic control unit 560. The switch 564 may also switch the detection area of the obstacle between the area B and both of the areas A and B.

The electronic control unit 560, upon receiving an obstacle detection signal from the detecting device 520, outputs a driving signal to the actuator 542 of the driving device 540, and actuates the buzzer 562 mounted on the housing. In short, when the obstacle is detected by the detecting device 520, the electronic control unit 560 actuates the actuator 542 to move the brake pedal BP in an actuation direction of the service brake. When the brake pedal BP is moved in the actuation direction, even if the operator of the wheel loader 100 does not step on the brake pedal BP, the service brake (not shown) is actuated to perform braking so that the wheel loader 100 can be emergency stopped. At this time, in order to suppress the back of the wheel loader 100 to be lifted by inertia, it is desirable for the electronic control unit 560, for example, to gradually move the brake pedal BP from an unactuated position to an actuated position of the service brake over a predetermined time, for example, 0.5 to 1 second.

Accordingly, even if the operator cannot recognize the obstacle intruding in a travel direction due to such as a blind spot and noise when the wheel loader 100 is moving backward, the service brake is automatically actuated through the brake pedal BP upon detection of the obstacle in the predetermined area, and enables the wheel loader 100 to stop in emergency. For this reason, even if, for example, the worker concentrates on work and fails to recognize that the wheel loader 100 approaches, the wheel loader 100 automatically stops so that the safety of the worker working around the wheel loader 100 can be secured. Here, the electronic control unit 560 can control the actuator 542 of the driving device 540 such that the emergency stop apparatus 500 is actuated only when the wheel loader 100 moves backward.

If the wheel loader 100 stops in emergency, in response to the operator pressing the switch (not shown), for example, the electronic control unit 560 may actuate the actuator 542 of the driving device 540 in an opposite direction so as to bring the brake pedal BP back to the unactuated position of the service brake.

Here, various embodiments of the driving device 540 will be explained.

In the explanations hereunder, in order to avoid confusion among the embodiments, the driving device will be explained with a new reference number.

Figure 6:
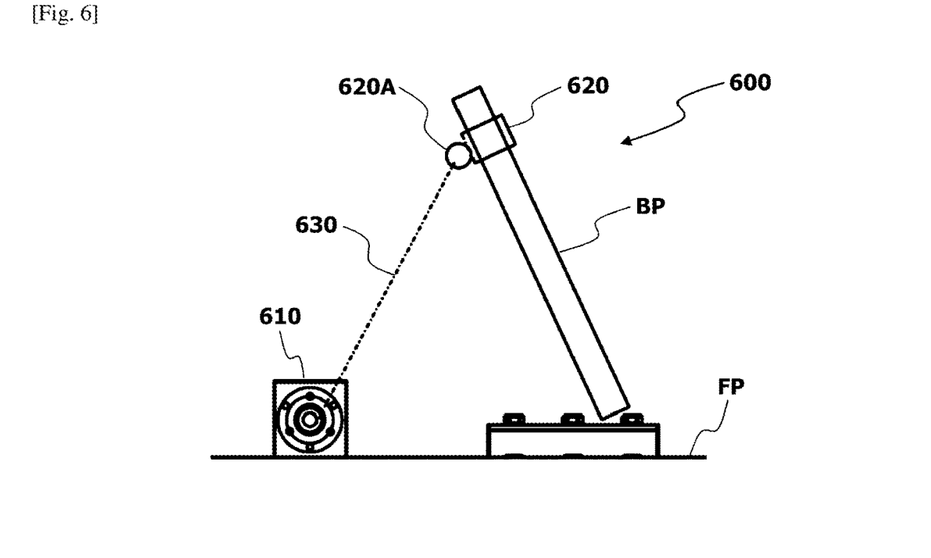
FIG. 6 is an illustration of a driving device according to a first embodiment in an unactuated state.
Figure 7:
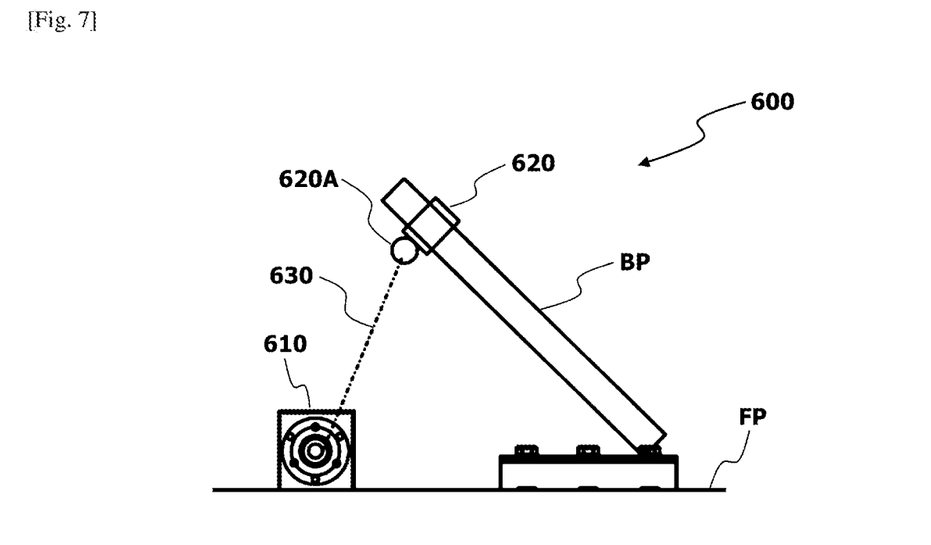
FIG. 7 is an illustration of the driving device according to the first embodiment in an actuated state.

FIGS. 6 and 7 illustrate the driving device 600 according to a first embodiment. The driving device 600 has an electric motor 610 as an example of the actuator, a fixing member 620, and a linear member 630 such as a chain or a wire having flexibility.

The electric motor 610 is, for example, fixed in a state in which an output shaft extends in the lateral direction to a floor panel FP of the back side of the brake pedal BP. The fixing member 620 is a member that can fix the brake pedal BP by sandwiching the brake pedal BP, and has, for example, a pair of plate members for sandwiching the brake pedal BP from the front and the back, and a bolt, a washer and a nut for coupling the pair of plate members in the thickness direction. Additionally, a ring 620A for connecting the linear member 630 is fixed to a surface of the fixing member 620 located at the back side of the brake pedal BP. The ring 620A may be substituted with a protrusion, for example. The linear member 630 is wound onto the output shaft of the electric motor 610, and a free end of the linear member 630 is connected to the ring 620A of the fixing member 620. At this time, the linear member 630 couples the electric motor 610 with the fixing member 620 so as not to obstruct the operator stepping on the brake pedal BP in the unactuated state of the emergency stop apparatus 500 (the same applies hereafter). Here, combination of the fixing member 620 and linear member 630 is the example of the coupling member.

According to the driving device 600 of the first embodiment, when the operator of the wheel loader 100 steps on the brake pedal BP in the unactuated state of the emergency stop apparatus 500, the linear member 630 slackens, so that it does not hinder the operation of the brake pedal BP. Accordingly, the operator of the wheel loader 100 can actuate the service brake by stepping on the brake pedal BP at will.

On the other hand, when the obstacle intrudes into a predetermined area located behind the wheel loader 100, the electric motor 610 rotates, and as shown in FIG. 7, the linear member 630 is wound onto the output shaft. When the linear member 630 is wound onto the output shaft of the electric motor 610, the relative distance between the electric motor 610 and the fixing member 620 is shortened, and the brake pedal BP is pulled in the electric motor 610 direction to actuate the service brake.

Figure 8:
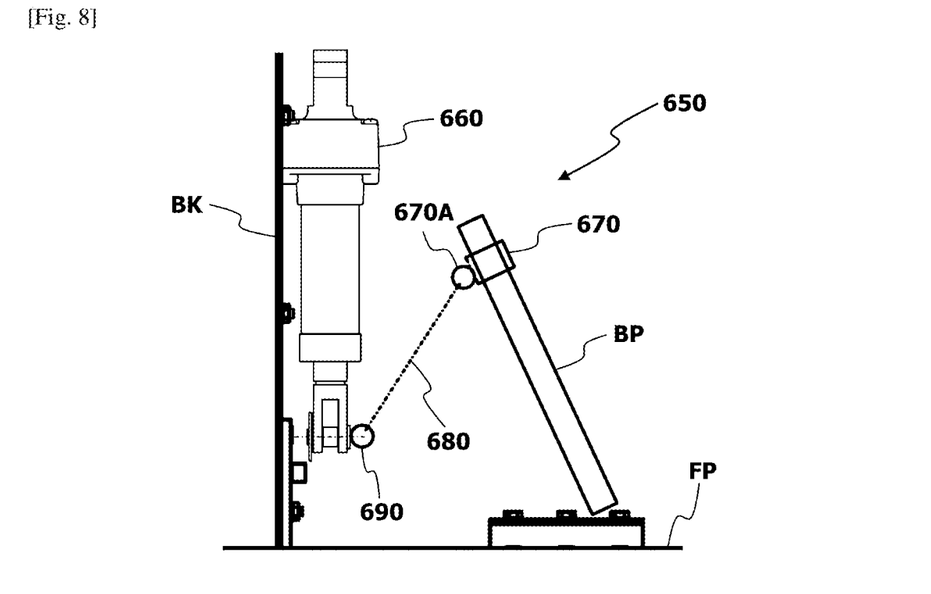
FIG. 8 is an illustration of a driving device according to a second embodiment in an unactuated state.
Figure 9:
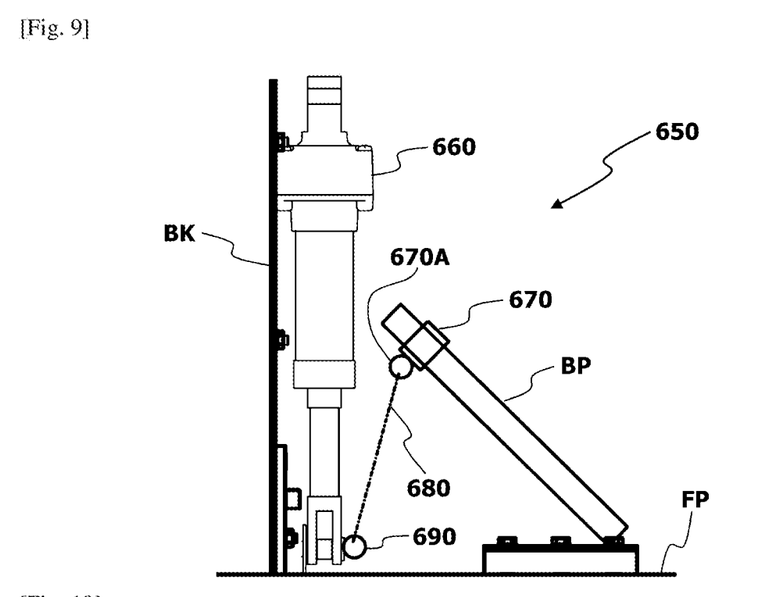
FIG. 9 is an illustration of the driving device according to the second embodiment in an actuated state.

FIGS. 8 and 9 illustrate a driving device 650 according to a second embodiment. The driving device 650 has a power cylinder 660 as an example of the actuator, a fixing member 670, and a linear member 680. At a back side of the brake pedal BP and through a bracket BK rising upward from the floor panel FP, the power cylinder 660 is fixed in a state in which the output shaft is located below. A ring 690 for connecting the linear member 680 is mounted on a tip section of the output shaft of the power cylinder 660. The ring 690 may be substituted with a protrusion, for example. The fixing member 670, which is the same as the previous first embodiment, will not be explained in order to avoid duplicate explanation. See the previous explanation in the first embodiment, if necessary (the same applies hereafter). An end of the linear member 680 is connected to the ring 690 mounted on the output shaft of the power cylinder 660, and another end of the linear member 680 is connected to a ring 670A of the fixing member 670. Here, combination of the fixing member 670 and linear member 680 is the example of the coupling member.

According to the driving device 650 of the second embodiment, when the operator of the wheel loader 100 steps on the brake pedal BP in the unactuated state of the emergency stop apparatus 500, the linear member 680 slackens, so that it does not hinder the operation of the brake pedal BP. Accordingly, the operator of the wheel loader 100 can actuate the service brake by stepping on the brake pedal BP at will.

On the other hand, when the obstacle intrudes into a predetermined area located behind the wheel loader 100, the output shaft of the power cylinder 660 extends, and as shown in FIG. 9, an end of the linear member 680 moves in the floor panel FP direction, that is, the direction away from the brake pedal BP. When the end of the linear member 680 moves in the floor panel FP direction, the other end of the linear member 680 also moves in the floor panel FP direction, because the linear member 680 has a constant length. When the other end of the linear member 680 moves in the floor panel FP direction, the brake pedal BP is pulled in the floor panel FP direction to actuate the service brake.

FIGS. 10 to 13 illustrate a driving device 700 according to a third embodiment. The driving device 700 has a power cylinder 710 as an example of the actuator, a link mechanism 720, a fixing member 730, and a linear member 740. At a back side of the brake pedal BP, the power cylinder 710 is fixed to a floor panel FP in a state in which an axial line extends in the lateral direction. The link mechanism 720 has a vertically extending rotating shaft 720A, a first lever 720B fixed to an intermediate portion of the rotating shaft 720A in a cantilevered state, a second lever 720C fixed to an upper end section of the rotating shaft 720A in a cantilevered state, and a holder 720D fixed to the floor panel FP and rotatably pivotally supports the rotating shaft 720A.

Figure 10:
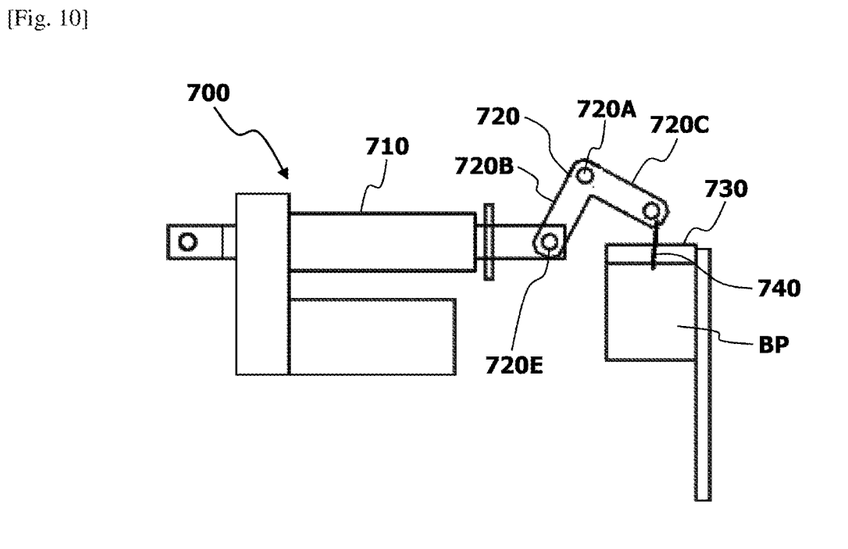
FIG. 10 is an illustration of a driving device according to a third embodiment in an unactuated state when viewed from below.
Figure 11:
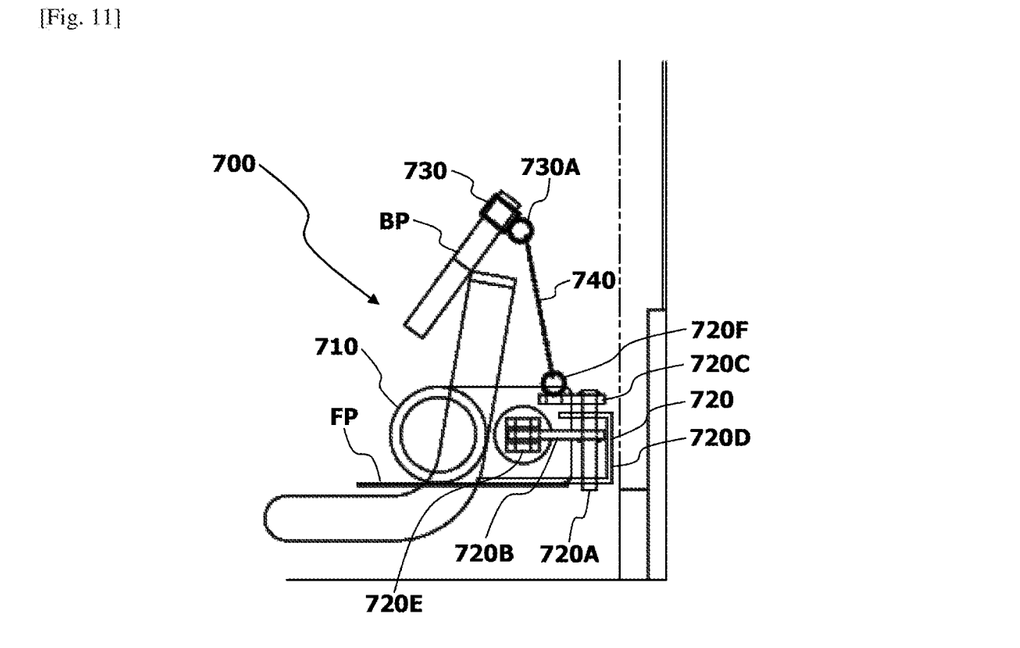
FIG. 11 is an illustration of the driving device according to the third embodiment in the unactuated state when viewed from side.

A free end of the first lever 720B is rotatably fixed to the output shaft of the power cylinder 710 through a pin member 720E vertically extending like the rotating shaft 720A. The second lever 720C is, for example, fixed to the rotating shaft 720A at an angle of substantially 90 degrees to the first lever 720B in a side view, and a ring 720F for connecting the linear member 740 is fixed to a free end of the second lever 720C. An end of the linear member 740 is connected to a ring 720F of the second lever 720C, and another end of the linear member 740 is connected to a ring 730A of the fixing member 730. The first lever 720B and second lever 720C are not limited to the separate type levers but can be an integrated lever having an L shape in a side view. Here, combination of the fixing member 730 and linear member 740 is the example of the coupling member.

According to the driving device 700 of the third embodiment, when the operator of the wheel loader 100 steps on the brake pedal BP in the unactuated state of the emergency stop apparatus 500, the linear member 740 slackens, so that it does not hinder the operation of the brake pedal BP. Accordingly, the operator of the wheel loader 100 can actuate the service brake by stepping on the brake pedal BP at will.

Figure 12:
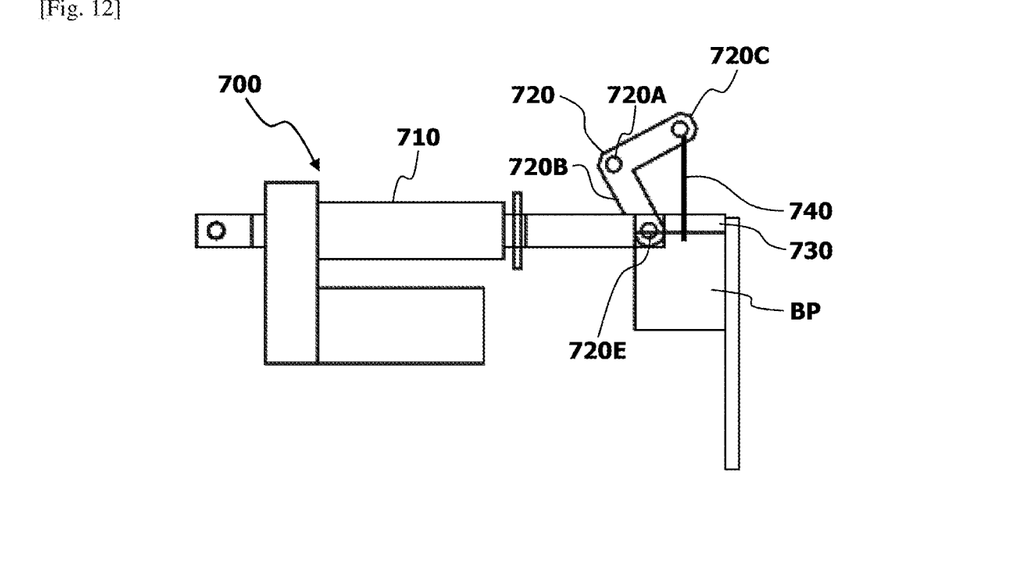
FIG. 12 is an illustration of the driving device according to the third embodiment in an actuated state when viewed from below.
Figure 13:
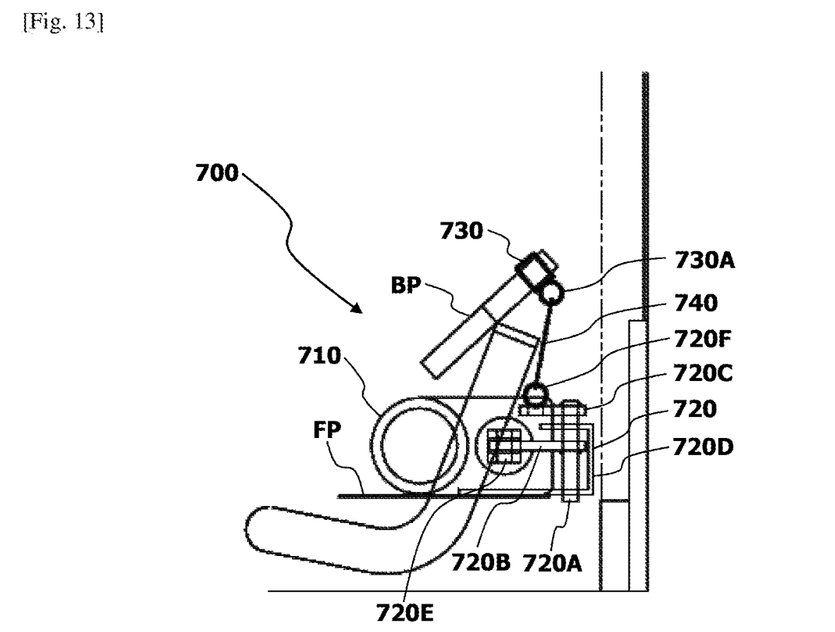
FIG. 13 is an illustration of the driving device according to the third embodiment in the actuated state when viewed from side.

On the other hand, when the obstacle intrudes into a predetermined area located behind the wheel loader 100, the output shaft of the power cylinder 710 extends, and as shown in FIGS. 12 and 13, the rotating shaft 720A rotates through the first lever 720B of the link mechanism 720. When the rotating shaft 720A rotates, the second lever 720C which extends in a direction different from the first lever 720B rotates in a direction away from the brake pedal BP. When the second lever 720C rotates, the free end of the second lever 720C moves away from the brake pedal BP so that the brake pedal BP is pulled in the floor panel FP direction through the linear member 740 to actuate the service brake.

Accordingly, as can be easily understood by comparing FIG. 10 with FIG. 12, the link mechanism 720 exercises a function which changes the actuation direction (expansion and contraction direction) of the power cylinder 710 by substantially 90 degrees, so that it can handle a small-sized wheel loader 100 having a smaller space for installing the emergency stop apparatus 500, for example. A distance for pulling the brake pedal BP can be changed by differentiating the length or angle of the first lever 720B and second lever 720C.

Figure 14:
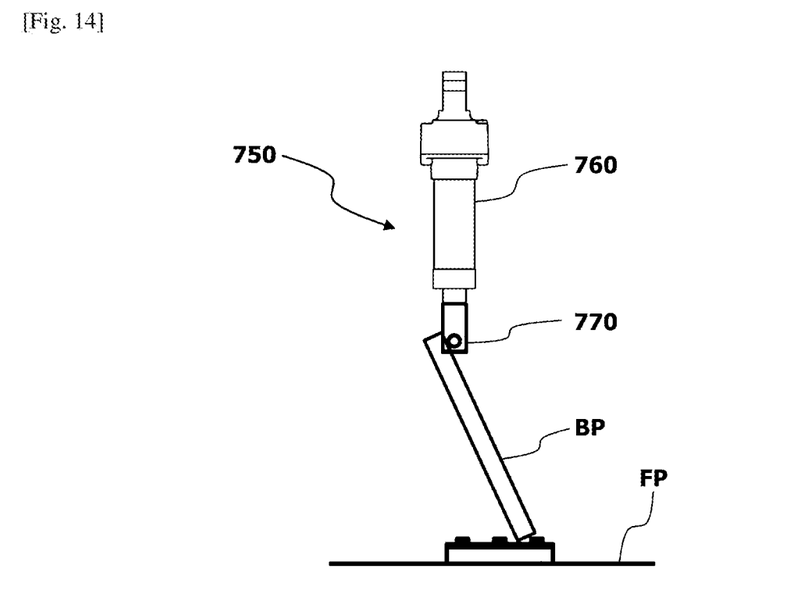
FIG. 14 is an illustration of a driving device according to a fourth embodiment in an unactuated state.
Figure 15:
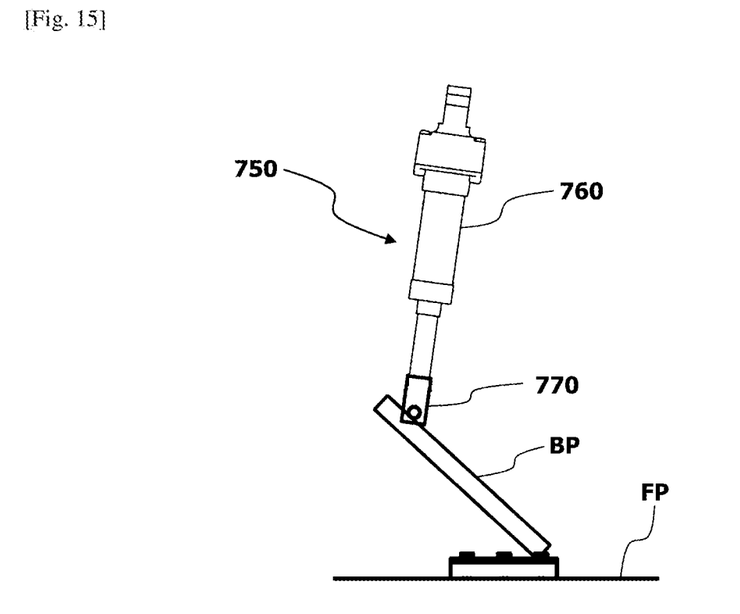
FIG. 15 is an illustration of the driving device according to the fourth embodiment in an actuated state.

FIGS. 14 and 15 illustrate a driving device 750 according to a fourth embodiment. The driving device 750 has a power cylinder 760 as an example of the actuator, and a pressing member 770. A base end portion of the power cylinder 760 is swingably fixed in a position facing a surface of the brake pedal BP, that is, a surface to be stepped on by the operator, about a laterally extending axis within a predetermined angle through, for example, a bracket (not shown) which is fixed to an inner panel of the driver stand 360. Additionally, a pressing member 770, which is capable of being contacted with and separated from a surface of the brake pedal BP and having an elastic member such as one of rubber affixed to a joint surface of the brake pedal BP, for example, is fixed to a tip section of the output shaft of the power cylinder 760. The pressing member 770 can be any shape such as a channel shape (U shape), a rectangular parallelepiped shape, a cylindrical shape, and a hemispherical shape, for example, for sandwiching opposite sides of the brake pedal BP. Here, the pressing member 770 is the example of the coupling member.

According to the driving device 750 of the fourth embodiment, when the operator of the wheel loader 100 steps on the brake pedal BP in the unactuated state of the emergency stop apparatus 500, the pressing member 770 can be contacted with and separated from brake pedal BP, and thus, even if the driving device 750 is in the unactuated state, it does not hinder the operation of the brake pedal BP. Accordingly, the operator of the wheel loader 100 can actuate the service brake by stepping on the brake pedal BP at will.

On the other hand, when the obstacle intrudes into a predetermined area located behind the wheel loader 100, the output shaft of the power cylinder 760 extends, and as shown in FIG. 15, the pressing member 770 pushes the brake pedal BP to actuate the service brake. At this time, a base end portion of the power cylinder 760 is swingably fixed in a predetermined area, and thus, the power cylinder 760 also swings according to the rotation of the brake pedal BP to suppress the pressing member 770 to be removed from the surface of the brake pedal BP.

Figure 16:
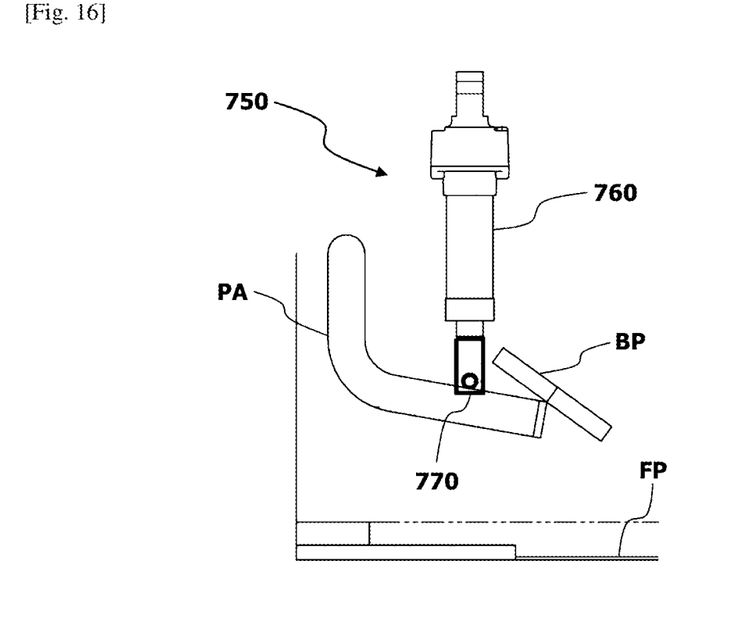
FIG. 16 is an illustration of the driving device according to a modification of the fourth embodiment in the unactuated state.
Figure 17:
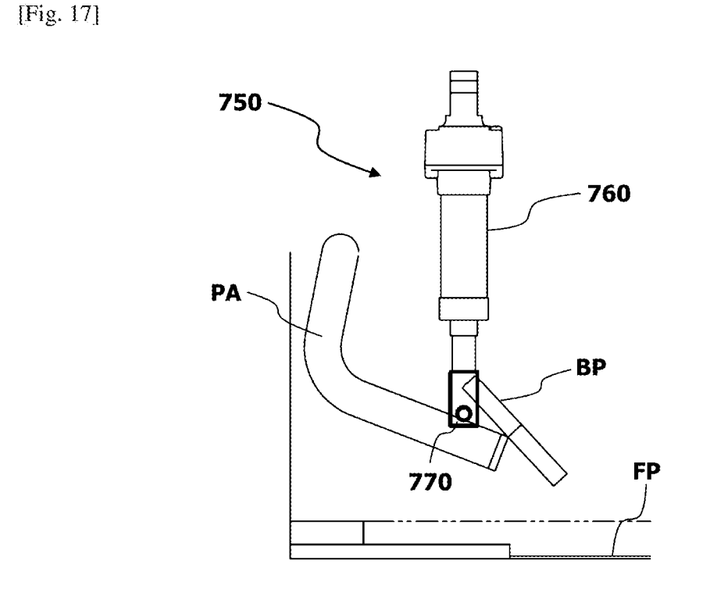
FIG. 17 is an illustration of the driving device according to the modification of the fourth embodiment in the actuated state.

In the case of a hanging brake pedal BP, as shown in FIGS. 16 and 17, the power cylinder 760 can also press the pedal arm PA through the pressing member 770. That is, the power cylinder 760 may press the brake pedal BP or a movable member attached to the brake pedal BP to actuate the service brake.

Figure 18:
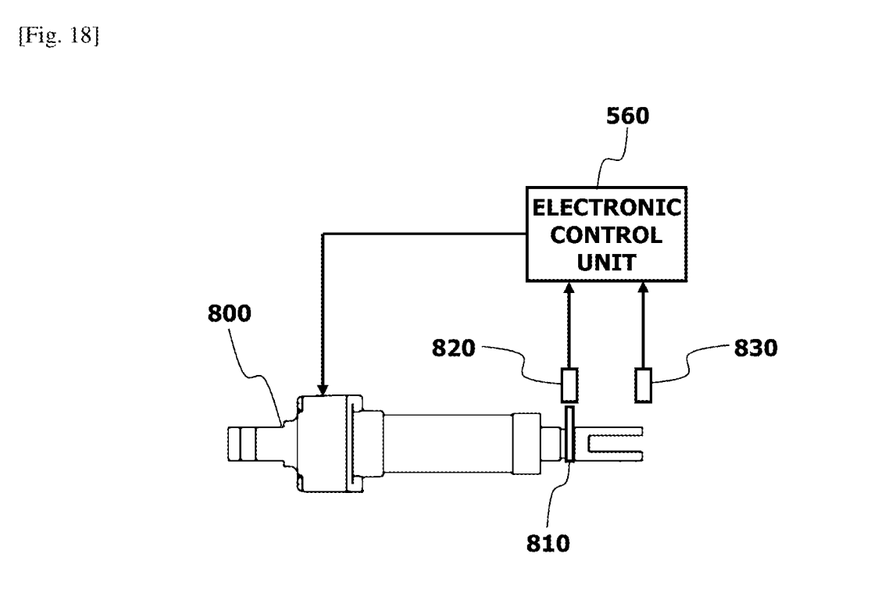
FIG. 18 is an illustration of a method for restricting an actuation area of a power cylinder in a state in which a service brake is released.
Figure 19:
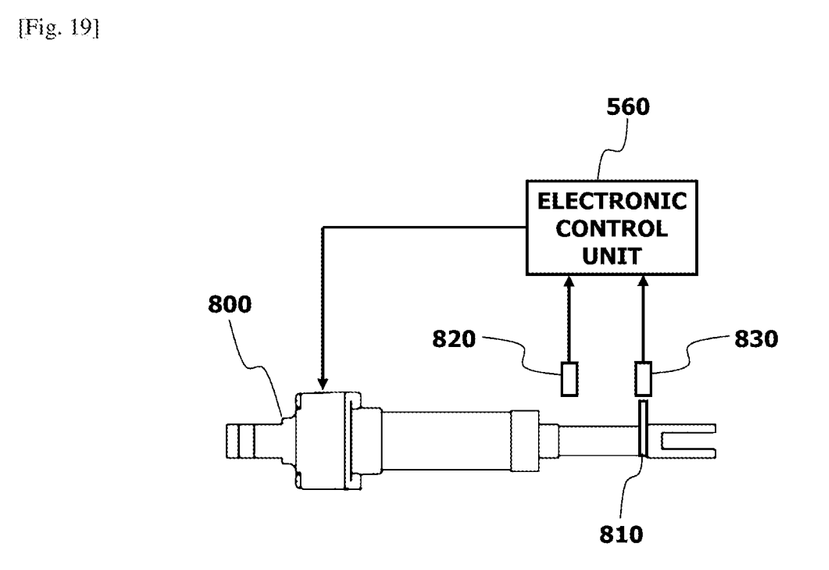
FIG. 19 is an illustration of a method for restricting the actuation area of the power cylinder in a state in which the service brake is actuated.

In the case if the emergency stop apparatus 500 is retrofitted to the existing wheel loader 100, an operation angle of the brake pedal BP may be different according to for example the specification and size of the wheel loader 100. Thus, as shown in FIGS. 18 and 19, a member 810 to be detected extended in a perpendicular direction relative to an axial line of the output shaft is mounted on an output shaft of the power cylinder 800, for example. Additionally, a first sensor 820 and a second sensor 830 such as a proximity switch and a limit switch, for example, are mounted on a rear vehicle body 300 or a member attached to the rear vehicle body 300. Here, the member 810 to be detected consists of a member which is detectable by the first sensor 820 and second sensor 830, and can be any shape such as an annular shape, a cube shape and a lever shape, for example.

The first sensor 820, as shown in FIG. 18, is mounted on a position for detecting the member 810 to be detected when in the state in which the output shaft of the power cylinder 800 is contracted and the service brake is released. The second sensor 830, as shown in FIG. 19, is mounted on a position for detecting the member 810 to be detected when in the state in which the output shaft of the power cylinder 800 is extended and the service brake is actuated.

Each output signal of the first sensor 820 and second sensor 830 is input to the electronic control unit 560. The electronic control unit 560, at the time of extending the output shaft of the power cylinder 800, stops actuating the power cylinder 800, if the second sensor 830 detects the member 810 to be detected. Additionally, the electronic control unit 560, at the time of contracting the output shaft of the power cylinder 800, stops actuating the power cylinder 800, if the first sensor 820 detects the member 810 to be detected.

Accordingly, the actuation area of the power cylinder 800 can be changed arbitrarily by mounting the first sensor 820 and second sensor 830 to positions adapted for the characteristics of the wheel loader 100. For this reason, it is possible to easily handle different operation angles of the brake pedal BP according to the specification and size of the wheel loader 100. The actuation area of the power cylinder 800 may define at least one of the state in which the output shaft is contracted and the service brake is released, and the state in which the output shaft is extended and the service brake is actuated.

At this time, in order to be able to adjust the mounting positions of the first sensor 820 and second sensor 830, for example, a long hole, which extends in a direction in which the output shaft of the power cylinder 800 is extended and contracted, is formed at a bracket attached to the power cylinder 800, and the first sensor 820 and second sensor 830 may be mounted by using the long hole. By doing so, the mounting positions of the first sensor 820 and second sensor 830 can be changed freely within the area of the long hole, even if the member adapted for the characteristics of the wheel loader 100 is not used.

The detecting device 520 is not limited to the stereo camera provided with a function for detecting an obstacle in the predetermined area, but the technique disclosed in JP2016-153558 A, which is previously presented by the Applicant, may be used. That is, the detecting device 520, as shown in FIG. 20, has two magnetic field generators 520A, an IC tag 520B worn by a worker 850 who works around the wheel loader 100, and a receiver 520C for receiving radio waves emitted from the IC tag 520B responsive to the magnetic field generated by the magnetic field generators 520A.

Figure 20:
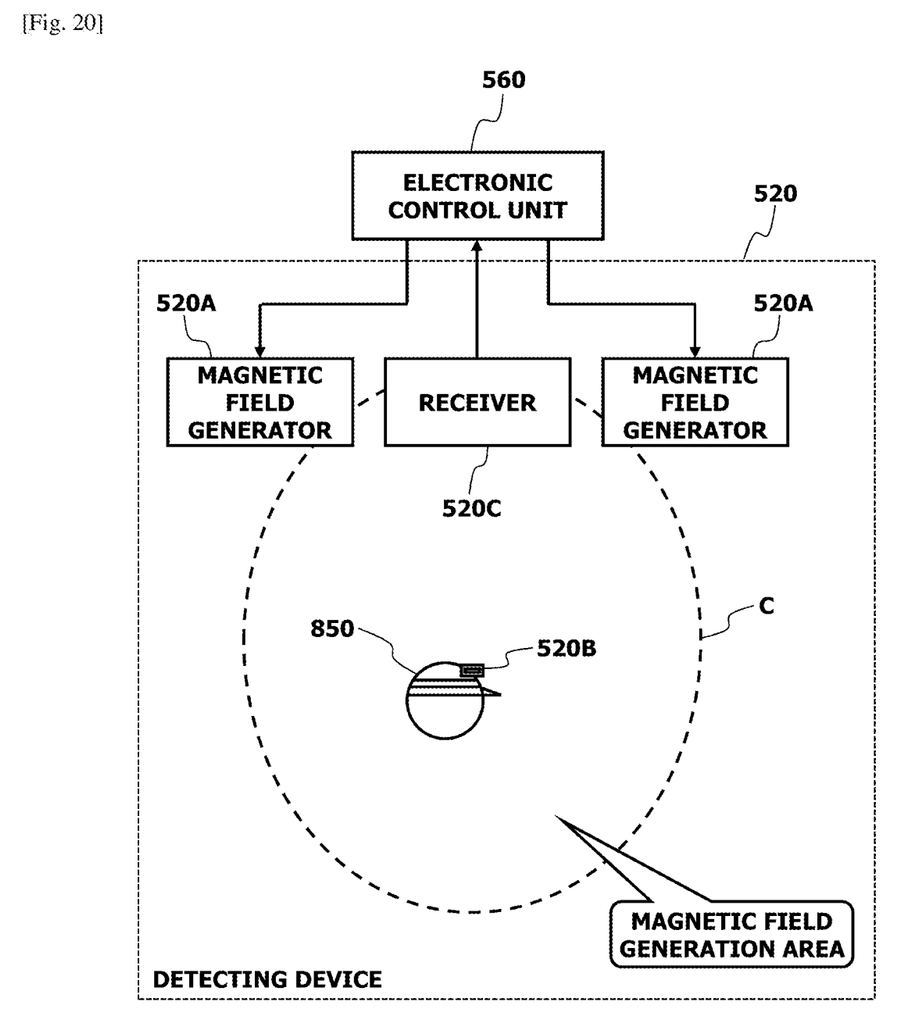
FIG. 20 is a system diagram illustrating another example of the detecting device.

The two magnetic field generators 520A, which are installed in the right and left end portions at the back of the wheel loader 100, generates a magnetic field in the predetermined area C behind the wheel loader 100 as shown in FIG. 20. Here, the two magnetic field generators 520A are controlled by the electronic control unit 560, and the predetermined area C for generating the magnetic field can be changed freely, for example, by changing the magnetic field strength according to the control signal from the electronic control unit 560.

The IC tag 520B can suppress consumption of the built-in battery by adopting a semi-active type which is activated upon detection of the magnetic field. Additionally, since the IC tag 520B is small and light in weight, the IC tag 520B can be mounted on a helmet of the worker 850, and can be placed in a pocket of the worker 850. The receiver 520C is mounted on a central portion at the back of the wheel loader 100, and an output signal of the receiver 520C is input to the electronic control unit 560.

The electronic control unit 560 monitors the output signal of the receiver 520C, and detects, for example, radio waves emitted from the IC tag 520B in response to the change. The electronic control unit 560, upon detection of the radio waves emitted from the IC tag 520B, determines that the worker 850 intrudes into the predetermined area C behind the wheel loader 100 to actuate the emergency stop apparatus 500.

The wheel loader 100 as an example of the working machine has been explained in the aforementioned embodiments; however, other working machines such as a motor grader, an asphalt distributer, a road cutting machine, a road sweeper, and a tired roller can be used.

One skilled in the art would readily understand that a new embodiment can be made by omitting a part of the technical idea of the embodiments, freely combining parts of the technical idea of the embodiments, and substituting a part of the technical idea of the embodiments.

REFERENCE SIGNS LIST

100 Wheel loader (Working machine)
300 Rear vehicle body (Vehicle body)
500 Emergency stop apparatus
520 Detecting device
520A Magnetic field generator
520B IC tag
520C Receiver
542 Actuator
544 Coupling member
560 Electronic control unit
610 Electric motor (Actuator)
620 Fixing member (Coupling member)
630 Linear member (Coupling member)
660 Power cylinder (Actuator)
670 Fixing member (Coupling member)
680 Linear member (Coupling member)
710 Power cylinder (Actuator)
720 Link mechanism
730 Fixing member (Coupling member)
740 Linear member (Coupling member)
760 Power cylinder (Actuator)
770 Pressing member (Coupling member)
800 Power cylinder (Actuator)
810 Member to be detected
820 First sensor
830 Second sensor
850 Worker
BP Brake pedal
PA Pedal arm

The invention claimed is:

1. An emergency stop apparatus for a working machine, comprising:
    a detecting device for detecting an obstacle intruding into a predetermined area around a working machine;
    an actuator fixed to a vehicle body of the working machine or a member attached to the vehicle body;
    a coupling member for coupling an output shaft of the actuator and a brake pedal; and
    an electronic control unit for actuating the actuator and moving the brake pedal in an actuation direction of a service brake when the obstacle is detected by the detecting device.

2. The emergency stop apparatus for the working machine according to claim 1, wherein the actuator is a power cylinder.

3. The emergency stop apparatus for the working machine according to claim 2, further comprising:
    a member to be detected mounted on an output shaft of the power cylinder; and
    at least one sensor for detecting the member to be detected, the at least one sensor fixed to a vehicle body of the working machine or a member attached to the vehicle body such that a position relative to an expansion and contraction direction of the output shaft of the power cylinder is adjustable,
    wherein the electronic control unit controls an actuation area of the power cylinder in response to an output signal of the at least one sensor.

4. The emergency stop apparatus for the working machine according to claim 1, wherein the coupling member comprises a flexible member, and the actuator pulls the brake pedal through the flexible member to move the brake pedal.

5. The emergency stop apparatus for the working machine according to claim 1, wherein the coupling member comprises a pressing member capable of being contacted with and separated from a surface of the brake pedal, and the actuator pushes the brake pedal through the pressing member to move the brake pedal.

6. The emergency stop apparatus for the working machine according to claim 1, wherein the output shaft of the actuator and the coupling member are connected through a link mechanism for changing an actuation direction of the output shaft of the actuator.

7. The emergency stop apparatus for the working machine according to claim 1, wherein the electronic control unit gradually moves the brake pedal from an unactuated position to an actuated position of the service brake over 0.5 to 1.0 second.

8. The emergency stop apparatus for the working machine according to claim 1, wherein the detecting device comprises a stereo camera having a function for detecting the obstacle.

9. The emergency stop apparatus for the working machine according to claim 1, wherein the detecting device has a magnetic field generator, an IC tag worn by a worker, and a receiver for receiving radio waves emitted from the IC tag responsive to a magnetic field generated by the magnetic field generator.

10. An emergency stop method for a working machine, wherein when an electronic control unit which is capable of reading an output signal of a detecting device for detecting an obstacle intruding into a predetermined area around the working machine and capable of outputting a driving signal to an actuator for moving a brake pedal in an actuation direction of the service brake detects an obstacle intruding into the predetermined area, the electronic control unit outputs the driving signal to the actuator to move the brake pedal in an actuation direction of the service brake to stop the working machine in an emergency.

* * * * *